United States Patent
Li et al.

(10) Patent No.: US 11,415,226 B1
(45) Date of Patent: Aug. 16, 2022

(54) MAGNETIC FLUID SEALING DEVICE FOR SEALING FLUID MEDIUM

(71) Applicant: Tsinghua University, Beijing (CN)

(72) Inventors: Decai Li, Beijing (CN); Xiao Liu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/572,777

(22) Filed: Jan. 11, 2022

(30) Foreign Application Priority Data

Mar. 29, 2021 (CN) .......................... 202110336402.9

(51) Int. Cl.
*F16J 15/43* (2006.01)
*F16J 15/3288* (2016.01)
*F16J 15/40* (2006.01)

(52) U.S. Cl.
CPC ........... *F16J 15/43* (2013.01); *F16J 15/3288* (2013.01); *F16J 15/403* (2013.01)

(58) Field of Classification Search
CPC ......... F16J 15/43; F16J 15/3288; F16J 15/403
See application file for complete search history.

(56) References Cited

U.S. PATENT DOCUMENTS

| 3,940,150 | A |   | 2/1976 | Martin et al. | |
|---|---|---|---|---|---|
| 4,335,885 | A | * | 6/1982 | Heshmat | F16J 15/42 277/427 |
| 11,092,241 | B1 | * | 8/2021 | Li | F16J 15/002 |
| 11,125,337 | B1 | * | 9/2021 | Li | F16J 15/162 |
| 2002/0074731 | A1 |   | 6/2002 | Uth | |
| 2011/0215533 | A1 | * | 9/2011 | Li | F16J 15/43 277/410 |
| 2017/0248168 | A1 | * | 8/2017 | Yamashita | F16C 37/00 |
| 2018/0306246 | A1 | * | 10/2018 | Sato | F16C 37/007 |

FOREIGN PATENT DOCUMENTS

| CN | 1031013 | 2/1996 |
|---|---|---|
| CN | 101415976 | 4/2009 |
| CN | 104455463 | 3/2015 |
| CN | 111442093 | 7/2020 |

OTHER PUBLICATIONS

CNIPA, First Office Action for CN Application No. 202110336402.9, dated Aug. 23, 2021.
CNIPA, Notification to Grant Patent Right for Invention for CN Application No. 202110336402.9, dated Sep. 13, 2021.

* cited by examiner

*Primary Examiner* — Vishal A Patel
(74) *Attorney, Agent, or Firm* — Hodgson Russ LLP

(57) ABSTRACT

A magnetic fluid sealing device includes a housing, a shaft, a magnetic fluid sealing assembly, a thermal conductive gasket and a resistance wire. The housing has a cavity. The shaft is pivotally arranged in the cavity, and at least one end of the shaft extends out of the cavity. The magnetic fluid sealing assembly is arranged in the cavity and fitted over the shaft. The thermal conductive gasket is arranged in the cavity and fitted over the shaft, an inner peripheral surface of the thermal conductive gasket is spaced apart from the shaft along a radial direction of the shaft, and the magnetic fluid sealing assembly is spaced apart from the thermal conductive gasket along an axial direction of the shaft. The resistance wire is arranged in the thermal conductive gasket and configured to vaporize a sealed fluid medium between the thermal conductive gasket and the shaft.

9 Claims, 1 Drawing Sheet

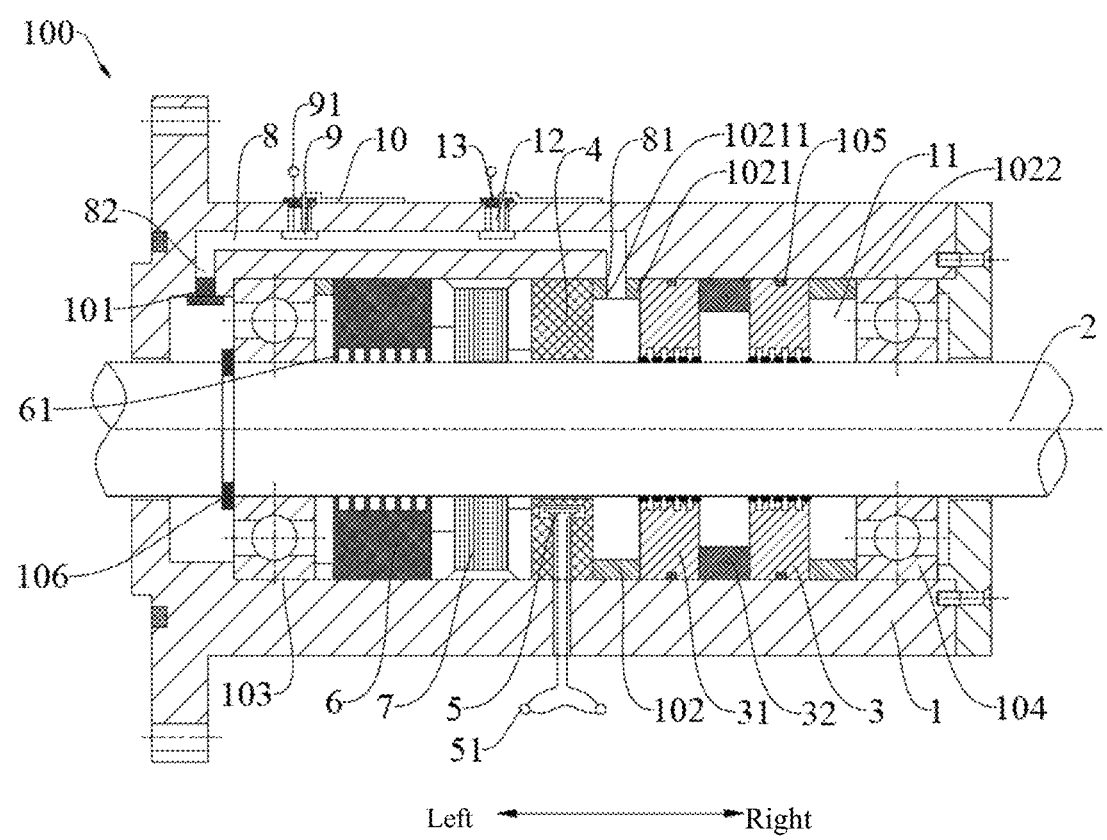

MAGNETIC FLUID SEALING DEVICE FOR SEALING FLUID MEDIUM

CROSS REFERENCE TO RELATED APPLICATION

The present application claims the benefit of and priority to Chinese Application No. 202110336402.9, filed on Mar. 29, 2021, the entire disclosure of which is incorporated herein by reference.

FIELD

The present disclosure relates to a field of mechanical engineering sealing, and more particularly to a magnetic fluid sealing device for sealing a fluid medium.

BACKGROUND

The magnetic fluid sealing technology has the advantages of zero leakage, no wear, long life, simple structure, etc., so it is used by more and more industries.

In the related art, when the magnetic fluid seals the fluid medium, the magnetic fluid tends to dissolve with the sealed fluid medium due to the instability of the contact interface between the two fluids, thereby resulting in the sealing failure. The environment with the high pressure and the high linear velocity will aggravate the instability of the liquid-liquid interface of the magnetic fluid and the sealed fluid medium, and also the magnetic fluid and the sealed fluid medium tend to emulsify in the environment with the high pressure and the high linear velocity, thereby resulting in a decrease in the performance of the magnetic fluid, which leads to the sealing failure.

SUMMARY

To this end, embodiments of the present disclosure propose a magnetic fluid sealing device for sealing a fluid medium, which has a simple structure and can prevent a contact between a sealed fluid medium and a magnetic fluid.

The magnetic fluid sealing device for sealing the fluid medium according to the embodiments of the present disclosure, includes: a housing having a cavity; a shaft pivotally arranged in the cavity, and at least one end of the shaft extending out of the cavity; a magnetic fluid sealing assembly arranged in the cavity and fitted over the shaft; a thermal conductive gasket arranged in the cavity and fitted over the shaft, an inner peripheral surface of the thermal conductive gasket being spaced apart from the shaft along a radial direction of the shaft, the magnetic fluid sealing assembly being spaced apart from the thermal conductive gasket along an axial direction of the shaft; a resistance wire arranged in the thermal conductive gasket and configured to vaporize a sealed fluid medium between the thermal conductive gasket and the shaft; and a condensing pipe arranged in the housing and having a first gas inlet and a fluid outlet, the first gas inlet of the condensing pipe being located between the magnetic fluid sealing assembly and the thermal conductive gasket, and the fluid outlet of the condensing pipe being located on a side of the thermal conductive gasket away from the magnetic fluid sealing assembly.

In the magnetic fluid sealing device for sealing the fluid medium according to the embodiments of the present disclosure, the thermal conductive gasket and the resistance wire are arranged to heat and vaporize the sealed fluid medium, so that the sealed fluid medium and the magnetic fluid are separated by a gas, thereby improving the service life of the magnetic fluid sealing device.

BRIEF DESCRIPTION OF THE DRAWINGS

FIG. 1 is a schematic view of a magnetic fluid sealing device for sealing a fluid medium according to an embodiment of the present disclosure.

DETAILED DESCRIPTION

Embodiments of the present disclosure are described in detail below, and examples of the embodiments are shown in the accompanying drawings. The embodiments described below with reference to the accompanying drawings are exemplary and are intended to explain the present disclosure. The embodiments shall not be construed as limiting the present disclosure.

A magnetic fluid sealing device for sealing a fluid medium according to an embodiment of the present disclosure will be described with reference to accompanying drawings.

As shown in FIG. 1, a magnetic fluid sealing device 100 for sealing a fluid medium according to an embodiment of the present disclosure includes a housing 1, a shaft 2, a magnetic fluid sealing assembly 3, a thermal conductive gasket 4, a resistance wire 5, and a condensation pipe 8.

The housing 1 has a cavity 11. Specifically, as shown in FIG. 1, a left end of the housing 1 has a flange part, and the flange part is provided with a plurality of threaded holes. The flange part is configured to be connected with a flange outside a sealed chamber (for example, a reaction kettle or a reaction tank), and the flange part is arranged adjacent to the sealed chamber.

The shaft 2 is pivotally arranged in the cavity 11, and at least one end of the shaft 2 extends out of the cavity 11. Specifically, as shown in FIG. 1, the shaft 2 extends along a left-right direction, both left and right ends of the shaft 2 extend out of the cavity 11, and the left end of shaft 2 extends out of the housing 1 such that the shaft 2 extends into the sealed chamber.

The magnetic fluid sealing assembly 3 is located in the cavity 11 and fitted over the shaft 2. Thus, a fluid in the sealed chamber is sealed.

The thermal conductive gasket 4 is arranged in the cavity 11 and fitted over the shaft 2. An inner peripheral surface of the thermal conductive gasket 4 is spaced apart from the shaft 2 in a radial direction of the shaft 2, and the magnetic fluid sealing assembly 3 is spaced apart from the thermal conductive gasket 4 along an axial direction of the shaft 2. Specifically, the magnetic fluid sealing assembly 3 is arranged on a right side of the thermal conductive gasket 4, a gap between the inner peripheral surface of the thermal conductive gasket 4 and an outer peripheral surface of the shaft 2 is less than or equal to 1 mm, and a length of the thermal conductive gasket 4 is not less than 5 cm.

The resistance wire 5 is arranged in the thermal conductive gasket 4 to vaporize a sealed fluid medium between the thermal conductive gasket 4 and the shaft 2. Specifically, as shown in FIG. 1, an outer peripheral surface of the thermal conductive gasket 4 is provided with a groove, the resistance wire 5 is arranged in the groove, and the resistance wire 5 is connected to an external AC power supply 51 through an electric wire.

The condensing pipe 8 is arranged in the housing 1, and the condensing pipe 8 has a first gas inlet 81 and a fluid outlet 82. The first gas inlet 81 of the condensing pipe 8 is located between the magnetic fluid sealing assembly 3 and the thermal conductive gasket 4. The fluid outlet 82 of the condensing pipe 8 is located on a side of the thermal conductive gasket 4 away from the magnetic fluid sealing assembly 3. Specifically, as shown in FIG. 1, the condensing pipe 8 is arranged in the housing 1, a right end of the condensing pipe 8 is the first gas inlet 81, a left end of the condensing pipe 8 is the fluid outlet 82, and the fluid outlet 82 is arranged on a left side of a labyrinth sealing assembly 6.

In the magnetic fluid sealing device 100 for sealing the fluid medium according to the embodiment of the present disclosure, the thermal conductive gasket 4 is arranged in the cavity 11 and fitted over the shaft 2, the inner peripheral surface of the thermal conductive gasket 4 is spaced apart from the shaft 2 in the radial direction of the shaft 2, and the magnetic fluid sealing assembly 3 is spaced apart from the thermal conductive gasket 4 in the axial direction of the shaft 2. Therefore, when the shaft 2 rotates, the sealed fluid medium will flow into the housing 1 due to the rotation of the shaft 2. When the sealed fluid medium flows into a gap between the thermal conductive gasket 4 and the shaft 2, the resistance wire 5 is energized and generates heat, so that the sealed liquid is vaporized by the thermal conductive gasket 4, so as to separate the magnetic fluid sealing assembly 3 from the sealed fluid medium by a gas, thereby avoiding the mutual dissolution of a magnetic fluid in the magnetic fluid sealing assembly 3 and the sealed fluid medium, which otherwise will result in the sealing failure. The present disclosure also solves the problem that an environment with a high pressure and a high linear velocity will aggravate the instability of a liquid-liquid interface of the magnetic fluid and the sealed fluid medium, so as to prevent the magnetic fluid and the sealed fluid medium from emulsifying, thereby increasing the service life of the magnetic fluid sealing assembly 3.

In the magnetic fluid sealing device 100 for sealing the fluid medium according to the embodiment of the present disclosure, the condensing pipe 8 is arranged in the housing 1, so that an air pressure in the cavity 11 and an air pressure in the sealed chamber are balanced, thereby maintaining an air pressure balance in the magnetic fluid sealing device 100 for sealing the fluid medium. When the gas passes through the condensing pipe 8, the gas can be liquefied through the condensing pipe 8, and the liquefied gas (i.e. a fluid) flows into the sealed chamber again. Since the first gas inlet 81 of the condensing pipe 8 has a high pressure, and the fluid outlet 82 of the condensing pipe 8 has a low pressure, the fluid in the condensing pipe 8 is pushed to flow from the first gas inlet 81 to the fluid outlet 82, thereby preventing a fluid backflow in the condensing pipe 8.

In some embodiments, a plurality of resistance wires 5 are provided, and the plurality of resistance wires 5 are arranged in the thermal conductive gasket 4. Therefore, the heating efficiency of the thermal conductive gasket 4 is improved, and it is ensured that the sealed fluid medium can be completely vaporized.

In some embodiments, a plurality of condensing pipes 8 are provided, and the plurality of condensing pipes 8 are evenly distributed in the housing 1 along a circumferential direction of the housing 1. Thus, a pressure difference in the housing 1 can be adjusted to prevent the magnetic fluid sealing assembly 3 from failing due to an excessive pressure in the housing 1.

In some embodiments, the magnetic fluid sealing device 100 for sealing the fluid medium further includes a refrigerating sheet 9 arranged outside the condensing pipe 8 so that the condensing pipe 8 condenses the gas into the fluid. Specifically, as shown in FIG. 1, a plurality of refrigerating sheets 9 are provided, and the plurality of refrigerating sheets 9 are attached to an outer wall of the condensing pipe 8. The refrigerating sheet 9 is connected to an external DC power supply 91 through an electric wire, thereby improving the liquefaction efficiency in the condensing pipe 8. Optionally, the refrigerating sheet 9 is a Peltier refrigerating sheet.

It can be understood that the refrigerating sheet 9 can also be arranged inside the condensing pipe 8, and the refrigerating sheet 9 can be attached to an inner peripheral surface of the condensing pipe 8, thereby further improving the refrigeration efficiency of the refrigerating sheet 9.

In some embodiments, the magnetic fluid sealing device 100 for sealing the fluid medium further includes a heat pipe 10. One end of the heat pipe 10 is attached to the refrigerating sheet 9, and the other end of the heat pipe 10 passes through the housing 1 and extends out of the housing 1, so as to dissipate heat from the refrigerating sheet 9. Specifically, as shown in FIG. 1, the housing 1 is provided with a plurality of mounting grooves 12, the refrigerating sheet 9 and the heat pipe 10 are arranged in the mounting groove 12, one end of the heat pipe 10 is fitted with the refrigerating sheet 9, and the other end of the heat pipe 10 extends out of the mounting groove 12, thereby facilitating the heat dissipation of the refrigerating sheet 9 and improving the refrigeration effect of the refrigerating sheet 9. A sealant 13 is arranged in the mounting groove 12 to prevent the gas from leaking from the mounting groove 12 to an external environment, thereby further ensuring the sealing performance of the magnetic fluid sealing device 100 for sealing the fluid medium.

In some embodiments, the magnetic fluid sealing device 100 for sealing the fluid medium further includes a fluid check valve 101. The fluid check valve 101 is arranged at the fluid outlet 82 of the condensing pipe 8 to prevent the sealed fluid medium from flowing into the condensing pipe 8 through the fluid outlet 82. Since the fluid outlet 82 of the condensing pipe 8 is arranged at a left end of the labyrinth sealing assembly 6, the fluid check valve 101 arranged at the fluid outlet 82 will not affect the flow of the liquefied fluid out of the condensing pipe 8 through the fluid outlet 82, and also can prevent the sealed fluid medium in the sealed chamber from directly entering the condensing pipe 8 through the fluid outlet 82.

In some embodiments, the magnetic fluid sealing device 100 for sealing the fluid medium further includes a magnetic isolation ring 102. The magnetic isolation ring 102 is arranged in the cavity 11 and surrounds the shaft 2. An inner peripheral surface of the magnetic isolation ring 102 is spaced apart from the outer peripheral surface of the shaft 2, the magnetic isolation ring 102 is arranged between the magnetic fluid sealing assembly 3 and the thermal conductive gasket 4, and the magnetic isolation ring 102 is provided with a second gas inlet 10211 opposite to the first gas inlet 81.

Specifically, as shown in FIG. 1, the magnetic isolation ring 102 includes a first magnetic isolation ring 1021 and a second magnetic isolation ring 1022. An outer peripheral surface of the first magnetic isolation ring 1021 is attached to an inner peripheral surface of the housing 1, an outer peripheral surface of the second magnetic isolation ring 1022 is also attached to the inner peripheral surface of the housing 1, the first magnetic isolation ring 1021 is arranged on a left side of the magnetic fluid sealing assembly 3, and the second magnetic isolation ring 1022 is arranged on a right side of the magnetic fluid sealing assembly 3. The first magnetic isolation ring 1021 and the second magnetic isolation ring 1022 can prevent magnetic lines of force generated by a permanent magnet 32 from leaking from two ends of a plurality of pole shoes 31, thereby enhancing the sealing performance of the magnetic fluid sealing assembly 3. Moreover, the first magnetic isolation ring 1021 is provided with the second gas inlet 10211 opposite to the first gas inlet 81, so that the gas can enter the first gas inlet 81 through the second gas inlet 10211, thereby entering the condensing pipe 8.

In some embodiments, the magnetic fluid sealing device 100 for sealing the fluid medium further includes a labyrinth sealing assembly 6. The labyrinth sealing assembly 6 is arranged in the cavity 11 and fitted over the shaft 2, and an inner peripheral surface of the labyrinth sealing assembly 6 is provided with a plurality of sealing tooth pieces 61, and the plurality of sealing tooth pieces 61 are spaced apart from one another in the axial direction of shaft 2. An inner peripheral surface of the sealing tooth piece 61 is spaced part from the outer peripheral surface of the shaft 2 along the radial direction of the shaft 2. The thermal conductive gasket 4 is located between the labyrinth sealing assembly 6 and the magnetic fluid sealing assembly 3.

Specifically, as shown in FIG. 1, the labyrinth sealing assembly 6 is arranged on a left side of the thermal conductive gasket 4, and the inner peripheral surface of the labyrinth sealing assembly 6 is provided with the plurality of sealing tooth pieces 61, adjacent sealing tooth pieces 61 and the inner peripheral surface of the labyrinth sealing assembly 6 define an empty cavity, and the inner peripheral surface of the sealing tooth piece 61 is spaced apart from the outer peripheral surface of the shaft 2 in the radial direction of the shaft 2 to form a fluid channel. When the sealed fluid medium flows through the fluid channel, the sealed fluid medium undergoes one time of throttling effects, so that the pressure of the sealed fluid medium decreases and the flow velocity of the sealed fluid medium increases. When the sealed fluid medium flows into the empty cavity behind the fluid channel, the volume of the sealed fluid medium increases in the empty cavity, so that the velocity of the sealed fluid medium decreases and a vortex flow is formed, thereby generating a certain amount of heat energy. Thus, each time the sealed fluid medium passes through the fluid channel and the subsequent empty cavity, the sealed fluid medium undergoes one time of throttling and expansion effects. With the increase of the numbers of gaps and empty cavities through which the sealed fluid medium flows, the flow velocity and the pressure drop of the sealed fluid medium become larger and larger. When the pressure drops to be approximate to the back pressure, the sealed fluid medium does not continue flowing out anymore, thereby realizing the sealing of the sealed fluid medium, and also resulting in certain sealing and depressurization effects on the sealed fluid medium.

It can be understood that the labyrinth sealing assembly 6 can be replaced with a backward-bladed impeller.

In some embodiments, the magnetic fluid sealing device 100 for sealing the fluid medium further includes a brush sealing assembly 7. The brush sealing assembly 7 is arranged in the cavity 11 and fitted over the shaft 2, and the brush sealing assembly 7 is located between the thermal conductive gasket 4 and the labyrinth sealing assembly 6. Specifically, as shown in FIG. 1, the labyrinth sealing assembly 6, the brush sealing assembly 7, and the magnetic fluid sealing assembly 3 are sequentially arranged on the shaft 2 from left to right, so that the brush sealing assembly 7 further depressurizes and seals the sealed fluid medium.

In some embodiments, an inner peripheral surface of the brush sealing assembly 7 is in contact with the outer peripheral surface of the shaft 2, so that heat is generated between the brush sealing assembly 7 and the shaft 2 when the shaft 2 rotates. As a result, the brush sealing assembly 7 and the shaft 2 are in contact with each other to generate a large amount of heat, thereby preliminarily vaporizing the sealed fluid medium and saving the electrical energy of the resistance wire 5.

It can be understood that the brush sealing assembly 7 can also be replaced with other contact seals.

In some embodiments, the magnetic fluid sealing assembly 3 includes a plurality of pole shoes 31 and a permanent magnet 32.

The plurality of pole shoes 31 are arranged in the cavity 11 and fitted over the shaft 2. Inner peripheral surfaces of the plurality of pole shoes 31 are spaced apart from the outer peripheral surface of the shaft 2 along the radial direction of the shaft 2. The magnetic fluid is filled between the inner peripheral surfaces of the plurality of pole shoes 31 and the outer peripheral surface of the shaft 2. The permanent magnet 32 is arranged in the cavity 11 and fitted over the shaft 2, and the permanent magnet 32 is located between two adjacent pole shoes 31. Thus, the magnet, the pole shoe 31 and the shaft 2 form a closed magnetic circuit, the permanent magnet 32 is used to generate a non-uniform magnetic field with strong and weak portions alternated with each other between the pole shoe 31 and the shaft 2, and the magnetic fluid is adsorbed between a pole tooth of the pole shoe 31 and the shaft 2, so that the magnetic fluid is filled in the gap, thereby generating a pressure resistance and achieving the purpose of sealing.

In some embodiments, the magnetic fluid sealing device 100 for sealing the fluid medium further includes a first bearing 103 and a second bearing 104, and the first bearing 103 and the second bearing 104 are arranged in the housing 1 and mounted on the shaft 2. Specifically, as shown in FIG. 1, the first bearing 103 is arranged on a left side of the labyrinth sealing assembly 6, and the second bearing 104 is arranged on a right side of the second magnetic isolation ring 1022, so that the shaft 2 can rotate smoothly in the housing 1.

Optionally, both the first bearing 103 and the second bearing 104 adopt rolling bearings.

In some embodiments, the magnetic fluid sealing device 100 for sealing the fluid medium further includes a sealing ring 105. An outer peripheral surface of the pole shoe 31 is provided with an annular groove, the sealing ring 105 is fitted in the annular groove, and an outer peripheral surface of the sealing ring 105 is attached to the inner peripheral surface of the housing 1. Since the sealing ring 105 is arranged in the outer peripheral surface of the pole shoe 31, the sealed fluid medium can be prevented from leaking to the external environment from a gap between the inner peripheral surface of the housing 1 and the outer peripheral surface of the pole shoe 31, thereby ensuring the sealing performance of the magnetic fluid sealing assembly 3.

In some embodiments, the outer peripheral surface of a first end of the shaft 2 (a left end of the shaft 2 in FIG. 1) is provided with a groove along the radial direction of the shaft 2, and a circlip 106 is mounted in the groove. A part of the circlip 106 protrudes out of the groove to be fitted with the first bearing 103. Specifically, as shown in FIG. 1, the outer peripheral surface of a left portion of the shaft 2 is provided with a groove along the radial direction of the shaft 2, the groove is arranged on a left side of the first bearing 103, and a circlip 106 is arranged in the groove. A part of the circlip 106 protrudes out of the groove to be attached to an inner ring of the first bearing 103. When the parts in the housing 1 are damaged or the magnetic fluid needs to be added, the circlip 106 will push the parts on the shaft 2 to be taken out of the housing 1, so as to facilitate the addition of the magnetic fluid or the replacement of the bearing, the brush sealing assembly 7 and the labyrinth sealing assembly 6.

In the magnetic fluid sealing device for sealing the fluid medium according to the embodiments of the present disclosure, the condensing pipe, the thermal conductive gasket and the resistance wire are arranged and cooperate to heat and vaporize the sealed fluid medium. Through the arrangement of the condensing pipe, not only the air pressure in the housing can be kept balanced, but also the gasified medium can be liquefied and recovered, thereby avoiding the waste of resources. In addition, the brush sealing assembly and the labyrinth sealing assembly are arranged to depressurize and seal the fluid flowing into the housing, thereby ensuring that the fluid flowing between the thermal conductive gasket and the shaft can be completely vaporized.

In the description of the present invention, it is to be understood that the orientations or positional relationships, indicated by the terms "central", "longitudinal", "lateral", "length", "width", "thickness", "on", "under", "front", "rear", "left", "right", "vertical", "horizontal", "top", "bottom", "inside", "outside", "clockwise", "counterclockwise", "axial", "radial", "circumferential", and the like, are based on the orientations or positional relationships shown in the drawings and are only for the purpose of facilitating and simplifying the description of the present invention, rather than indicating or implying that the described device or element must have a particular orientation or must be constructed and operated in a particular orientation, and therefore they cannot to be construed as limiting the present invention.

Moreover, the terms "first" and "second" are used for descriptive purposes only and are not to be construed as indicating or implying a relative importance or implicitly indicating the number of technical features indicated. Thus, features defined by the term "first" or "second" may include at least one of the features, either explicitly or implicitly. In the description of the present invention, the meaning of "a plurality of" is at least two, such as two, three, etc., unless specifically defined otherwise.

In the present invention, unless explicitly stated and defined otherwise, the terms "mounted", "connected with", "connected", "fixed" and the like shall be understood broadly; for example, it may be either a fixed connection or a detachable connection, or in one piece; it may be a mechanical connection, or it may be an electrical connection or a mutual communication; it may be a direct connection or indirect connection through an intermediate medium, and may be an internal communication of two components or an interaction relationship between two components, unless otherwise expressly defined. For those skilled in the art, the specific meanings of the above terms in the present disclosure could be understood according to the specific conditions.

In the present disclosure, the first feature being "on" or "under" the second feature may mean that the first feature and the second feature are in a direct contact, or the first and second features may be in an indirect contract through an intermediate medium, unless otherwise explicitly stated and defined. Moreover, the first feature being "at the top of", "above" and "on" the second feature may mean that the first feature is right above or above and to one side of the second feature, or may merely mean that the first feature is horizontally higher than the second feature. The first feature being "at the bottom of", "below" and "under" the second feature may mean that the first feature is below or below and to one side of the second feature, or may merely mean that the first feature is horizontally lower than the second feature.

In the present disclosure, the description with reference to the terms "one embodiment", "some embodiments", "example", "specific example", or "some examples" and the like means specific features, structures, materials or characteristics described in connection with the embodiment or example are included in at least one embodiment or example of the present disclosure. In the present specification, the schematic representation of the above terms is not necessarily directed to the same embodiment or example. Furthermore, the specific features, structures, materials, or characteristics described may be combined in a suitable manner in any one or more embodiments or examples. In addition, those skilled in the art can integrate and combine various embodiments or examples described in the present specification, as well as features of various embodiments or examples, without contradicting each other.

Although the embodiments of the present disclosure have been shown and described, it would be understood that the above-described embodiments are illustrative and are not to be construed as limiting the scope of the present disclosure. Changes, modifications, substitutions and variations of the above-described embodiments may be made by those skilled in the art within the scope of the present disclosure.

What is claimed is:

1. A magnetic fluid sealing device for sealing a fluid medium, comprising:
    a housing having a cavity;
    a shaft pivotally arranged in the cavity, and at least one end of the shaft extending out of the cavity;
    a magnetic fluid sealing assembly arranged in the cavity and fitted over the shaft;
    a thermal conductive gasket arranged in the cavity and fitted over the shaft, an inner peripheral surface of the thermal conductive gasket being spaced apart from the shaft along a radial direction of the shaft, the magnetic fluid sealing assembly being spaced apart from the thermal conductive gasket along an axial direction of the shaft;
    a resistance wire arranged in the thermal conductive gasket and configured to be energized and generate heat to vaporize a sealed fluid medium between the thermal conductive gasket and the shaft; and
    a condensing pipe arranged in the housing and having a first gas inlet and a fluid outlet, the first gas inlet of the condensing pipe being located between the magnetic fluid sealing assembly and the thermal conductive gasket, and the fluid outlet of the condensing pipe being located on a side of the thermal conductive gasket away from the magnetic fluid sealing assembly;
    wherein the magnetic fluid sealing assembly comprises:
        a plurality of pole shoes arranged in the cavity and fitted over the shaft, and inner peripheral surfaces of the plurality of pole shoes being spaced apart from an outer peripheral surface of the shaft along the radial direction of the shaft, and a magnetic fluid being filled between the inner peripheral surfaces of the plurality of pole shoes and the outer peripheral surface of the shaft; and
        a permanent magnet arranged in the cavity and fitted over the shaft, and the permanent magnet being located between two adjacent pole shoes.

2. The magnetic fluid sealing device for sealing the fluid medium according to claim 1, further comprising a refrigerating sheet, wherein the refrigerating sheet is arranged outside the condensing pipe and configured to condense a gas in the condensing pipe into a liquid.

3. The magnetic fluid sealing device for sealing the fluid medium according to claim 2, further comprising a heat pipe, wherein one end of the heat pipe is attached to the refrigerating sheet, and the other end of the heat pipe passes through the housing and extends out of the housing to dissipate heat from the refrigerating sheet.

4. The magnetic fluid sealing device for sealing the fluid medium according to claim 1, further comprising a fluid check valve, wherein the fluid check valve is arranged at the fluid outlet of the condensing pipe to prevent the sealed fluid medium from flowing into the condensing pipe through the fluid outlet.

5. The magnetic fluid sealing device for sealing the fluid medium according to claim 1, further comprising a magnetic isolation ring, wherein the magnetic isolation ring is arranged in the cavity and surrounds the shaft, an inner peripheral surface of the magnetic isolation ring is spaced apart from an outer peripheral surface of the shaft, the magnetic isolation ring is arranged between the magnetic fluid sealing assembly and the thermal conductive gasket, the magnetic isolation ring is provided with a second gas inlet, and the second gas inlet is opposite to the first gas inlet.

6. The magnetic fluid sealing device for sealing the fluid medium according to claim 1, wherein a plurality of resistance wires are provided, and the plurality of resistance wires are arranged in the thermal conductive gasket; and a plurality of condensing pipes are provided, and the plurality of condensing pipes are evenly distributed in the housing along a circumferential direction of the housing.

7. The magnetic fluid sealing device for sealing the fluid medium according to claim 1, further comprising a labyrinth sealing assembly, wherein the labyrinth sealing assembly is arranged in the cavity and fitted over the shaft, an inner peripheral surface of the labyrinth sealing assembly is provided with a plurality of sealing tooth pieces, the plurality of sealing tooth pieces are spaced apart from one another in the axial direction of the shaft, an inner peripheral surface of the sealing tooth piece is spaced apart from an outer peripheral surface of the shaft along the radial direction of the shaft, and the thermal conductive gasket is located between the labyrinth sealing assembly and the magnetic fluid sealing assembly.

8. The magnetic fluid sealing device for sealing the fluid medium according to claim 7, further comprising a brush sealing assembly, wherein the brush sealing assembly is arranged in the cavity and fitted over the shaft, and the brush sealing assembly is located between the thermal conductive gasket and the labyrinth sealing assembly.

9. The magnetic fluid sealing device for sealing the fluid medium according to claim 8, wherein an inner peripheral surface of the brush sealing assembly is in contact with an outer peripheral surface of the shaft, so that heat is generated between the brush sealing assembly and the shaft when the shaft rotates.

\* \* \* \* \*